(12) United States Patent
Wilksch et al.

(10) Patent No.: US 6,408,813 B1
(45) Date of Patent: Jun. 25, 2002

(54) PISTON AND CONNECTING ROD RETENTION

(75) Inventors: Mark Conrad Wilksch, Buckingham Bucks; Martin Geoffrey Long, Northants; Philip Clive Franklin, Bicester, all of (GB)

(73) Assignee: Seneca Technology, Ltd., Turks & Caicos Islands (TC)

( * ) Notice: Subject to any disclaimer, the term of this patent is extended or adjusted under 35 U.S.C. 154(b) by 0 days.

(21) Appl. No.: 09/552,270

(22) Filed: Apr. 19, 2000

(30) Foreign Application Priority Data

Apr. 19, 1999 (GB) .............................................. 9908844

(51) Int. Cl.$^7$ .................................................. F16J 1/14
(52) U.S. Cl. .................................................. 123/197.3
(58) Field of Search ................ 92/188, 187; 123/197.3, 123/193.6

(56) References Cited

U.S. PATENT DOCUMENTS

| | | |
|---|---|---|
| 1,452,932 A | 4/1923 | Pritchard et al. |
| 2,819,936 A | 1/1958 | Cambeis |
| 2,926,975 A | 3/1960 | Karde et al. |
| 3,173,344 A | 3/1965 | Mongitore |
| 4,459,900 A | 7/1984 | LaBouff |
| 4,858,566 A | 8/1989 | Paul et al. |
| 4,938,121 A | 7/1990 | Melchior |
| 5,146,883 A | 9/1992 | Reipert et al. |
| 5,403,170 A * | 4/1995 | Bianchi et al. ................ 92/187 |
| 5,685,267 A | 11/1997 | Wiczynski |
| 5,794,582 A | 8/1998 | Horiuchi |
| 6,178,873 B1 * | 1/2001 | Pierobon et al. .............. 92/187 |

FOREIGN PATENT DOCUMENTS

| | | |
|---|---|---|
| DE | 3830033 A1 | 11/1987 |
| DE | 4 308 751 | 9/1994 |
| EP | 069 579 A1 | 1/1983 |
| GB | A 293 506 | 7/1928 |
| GB | 1467305 | 3/1977 |
| WO | WO 98/19067 A1 | 5/1998 |

\* cited by examiner

*Primary Examiner*—Marguerite McMahon
*Assistant Examiner*—Hyder Ali

(57) ABSTRACT

A piston and connecting rod assembly configured for high compressive loading, or arduous duty cycle, such as in a two-stroke compression-ignition (diesel) internal combustion engine incorporates a spherical or cylindrical bearing between the piston and the connecting rod small end. A closed unitary retaining ring with a threaded circumference securing the piston and connecting rod together. The retaining ring has a profiled aperture or slot to allow installation by passage over the connecting rod.

14 Claims, 2 Drawing Sheets

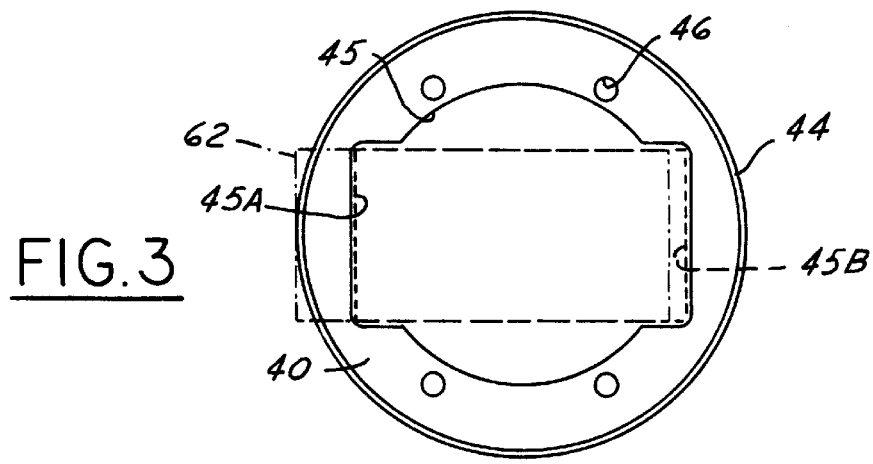
FIG. 3
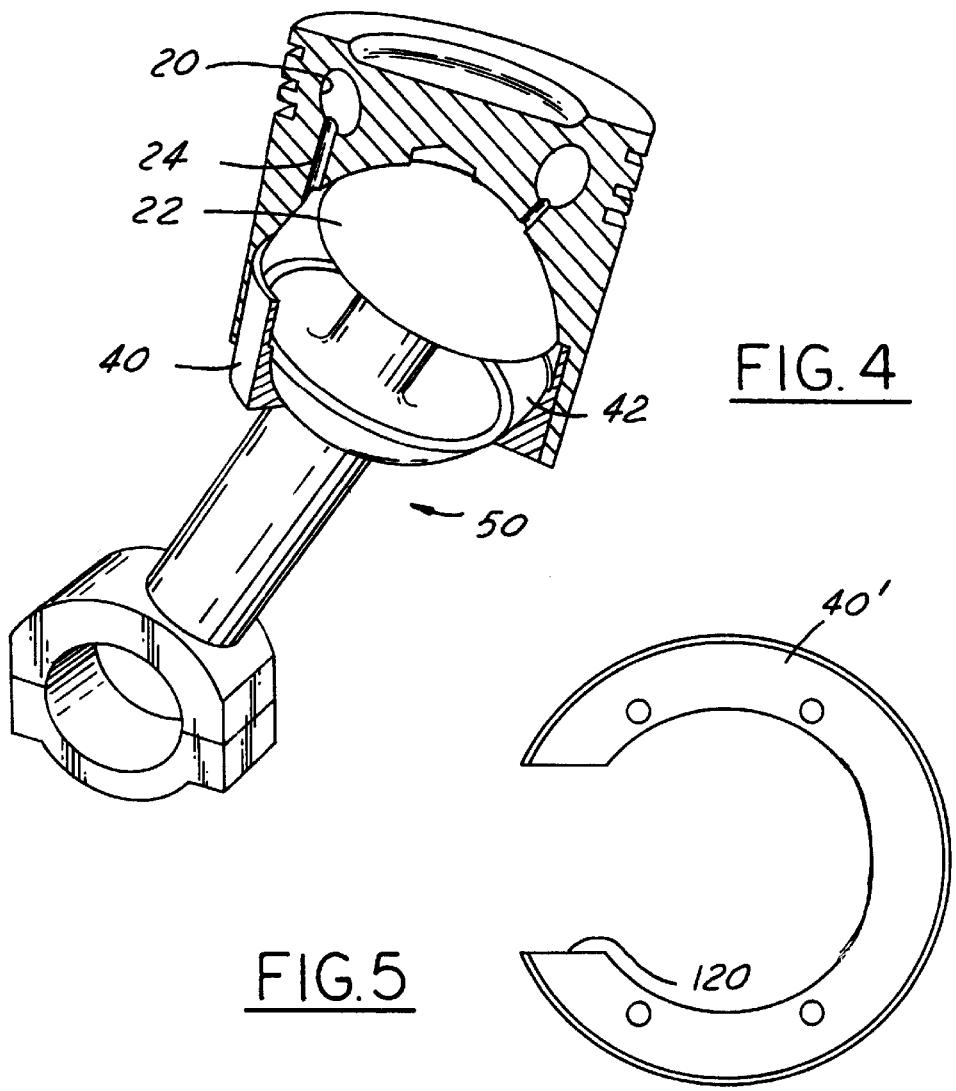
FIG. 4
FIG. 5

1

PISTON AND CONNECTING ROD RETENTION

TECHNICAL FIELD

The present invention relates to piston and connecting rod retention and/or connection in a positive displacement, reciprocating piston-in-cylinder device—whether a pump or prime mover, such as an internal combustion engine.

BACKGROUND

U.S. Pat. No. 5,146,883, DE-A-4,308,751, U.S. Pat. No. 5,305,684, U.S. Pat. No. 4,858,566, U.S. Pat. No. 4,459,900, U.S. Pat. No. 3,173,344, U.S. Pat. No. 2,819,936, UK-A-293,506 and CIMAC Helsinki 1981 Conference Paper D1 09, variously disclose "spherically-jointed" piston and connecting rod assemblies with a multi-part retaining ring of split, or distinct, elements or parts, but none with a subtended arc angle of more than 180 degrees.

The connecting rod assembly itself is also generally in two parts. One part comprises a small end, shank, and upper big end bearing housing. Another part comprises a connecting rod end cap, which forms the lower portion of a circular bearing housing for the big end bearing. Suitable fasteners are installed to hold these elements together.

The joint between piston and connecting rod small end includes a bearing (surface) allowing relative (rotational) movement. While the piston is confined by its contact with cylinder walls—to at least a linear reciprocating motion within the cylinder—the nature and degree of freedom of relative movement admitted between piston and connecting rod (small end) joint, reflects the joint configuration. The joint bearing surface must be adapted accordingly.

Thus, a (part-)spherical joint allows both (connecting rod) articulation or tilting, and rotation of the piston about its axis. This contrasts with a conventional cylindrical journal bearing of a so-called "gudgeon" or "wrist" pin joint, which allows tilting, but not rotation.

Generally, piston rotation tends to adopt a sporadic form, spreading wear around the cylinder wall circumference, rather than a continuous rotation, which could engender an adverse (localized, e.g. annular) wear mode. More specifically, in a spherical joint, complementary opposed bearing surfaces are formed on the small end of a connecting rod; the underside of a piston body; and the upper side of a piston retaining ring. There is necessarily a small clearance between the various bearing surfaces of the piston and connecting rod assembly, to allow relative rotation, but to minimize relative axial movement.

Principal advantages of a substantially spherical, or part-spherical, joint bearing contact surface, compared to a more conventional (gudgeon or wrist) pinned joint, include: (a) piston expansion is symmetrical about its longitudinal (reciprocating) axis, affording manufacturing simplification, and smaller running clearances; (b) piston skirt wear is spread more evenly around the entire piston (skirt) circumference, promoting longer piston service life; and (c) the bearing area available for carrying principal compressive load can be increased thus either reducing bearing loading, or increasing the load carrying capacity.

Hitherto, as with the particular art identified, (part-) spherical piston-connecting rod bearings have generally used a split (or multi-part) retaining ring, to allow installation within the piston and around the connecting rod. Commonly, a further retaining ring is employed to hold this split ring to the piston body as, for example, demonstrated in the disclosures of SAE Paper 960055, DE-A-4,308751, U.S. Pat. No. 2,819,936. In one variant in SAE Paper 960055, an entire (part-) spherical bearing surface is formed in the body of the piston, with no separate retaining ring. The machining and assembly complexities attendant these solutions are unattractive for mass production.

SUMMARY OF THE INVENTION

According to one aspect of the present invention, a piston assembly comprises a piston fitted with a connecting rod coupled thereto by a (pivot or swivel) joint, itself retained by a unitary (retaining or retention) ring. Another aspect of the invention provides a unitary (retaining or retention) ring, for such a piston assembly. The retaining ring could be configured as either a partly, or completely, closed loop.

The retaining ring is installed upon, or within, a piston to lie generally transversely of the piston axis. The retaining ring cross-section is uniform, or (periodically) varied throughout its circumference, for example, providing a series of spaced bearing contact regions or "lands", protruding or upstanding from a lesser ring cross-section. A certain symmetry of form is desirable. An undulating, or corrugated, profile can be employed.

The retaining section could change orientation throughout its circumference, e.g. by twisting, provided again a symmetry of collective or cumulative bearing surfaces were preserved.

The overall retaining ring profile or contour can be flat, or at least before installation "canted" or periodically "wavy", with corrugated forms providing contact lands. Thus, for example, in a part-closed retaining ring (but distinct from the minor, arcuate ring segments of the art), opposite ends could lie in different planes. A helical, or part-helical ring would be a case in point—again desirably providing a substantially symmetrical overall bearing geometry, if not of the whole ring, then localized contact lands. The helix could be compacted into a flat, or at least flatter form, upon installation, providing a tight sprung fit, without the need for supplementary circlips or other fasteners.

Generally, a unitary retaining ring configuration represents a simplification in construction, manufacture and assembly—over the known multi-part ring art identified.

Preferably, the internal profile of such a unitary retaining ring, and the (complementary) external profile of the associated connecting rod, allow the ring to pass over the rod, (even at its point of greatest cross-section, that is usually its big end, with the big end bearing cap removed.

The retaining ring may be configured as a continuous closed loop, with an asymmetric internal aperture profile to complement or fit around the connecting rod cross-section. Alternatively, the retaining ring may be only partially closed, that is, of less than 360 degrees circumferential span, for example, configured as a form of horseshoe. Such a partially-closed retaining ring need not pass over the connecting rod big end, but rather may be fitted laterally onto the connecting rod shank. In either case, the component count is less than for a split retaining ring assembly of the known art identified. Moreover, the surfaces to be machined are readily accessible and of relatively simple form.

Overall symmetry of piston and bearing configuration provide stable expansion characteristics, in turn promoting: a low engine oil consumption; and a reduced leakage ("blow-by") of working fluid. These benefits tend to prevail throughout a long useful working life, since the ring grooves will not suffer the asymmetric distortions that occur with more conventional pinned joints.

Some means of positive mechanical entrainment between the retaining ring and piston (internal) wall is desirably employed for a secure inter-connection. To this end, conveniently, the retaining ring has an external thread, to mate with a complimentary threaded internal bore in the piston wall.

Torque tool locating recesses, or modest protruding lugs, may be incorporated in the ring body, to facilitate tightening of the threaded interconnection with the piston. Alternatively, a circlip may be fitted beneath, or into a circumferential wall slot within, the retaining ring, in order to locate in a groove or ledge in the internal piston wall.

In another embodiment, several circumferentially-spaced, such as longitudinally-directed threaded fasteners, may be fitted to pass through the piston retaining ring into the body of the piston (crown). Radial fasteners can be an alternative or supplementary approach.

A piston assembly with connecting rod retention according to the invention is compatible with engines needing high cylinder pressure capability, in order to minimize emissions and fuel consumption. This compatibility arises largely through the increased bearing area, but also by improved stress distribution and minimal shape distortion.

Hitherto known pistons capable of withstanding the stresses produced in high pressure engines generally employ steel for the main structure. Some examples would be steel-crowned "articulated" pistons; single-piece cast, or fabricated, steel pistons; and steel-crowned, composite pistons. With the adoption of such robust steel pistons, very high bearing pressures are encountered, calling for advanced bearing materials or treatments which tends to increase their cost. In contrast, a piston with connecting rod retention of the present invention can be made at much lower cost (than steel), preferably in aluminum alloy, although cast iron would also be well-suited.

The attendant large bearing area is particularly suitable for arduous duty, such as is experienced with two-stroke diesel engines. Operationally, in a two-stroke combustion cycle, there is no load reversal and so the small end bearing design is critical. Additionally, since, in a two-stroke cycle engine, the load is always compressive in the connecting rod, the big end bearing itself may not need a (substantial confinement or retention) closure cap. Similarly, in a two-stroke cycle engine, the main load-bearing part of a connecting rod big end circumference need only embrace an arc some 120 degrees or less.

Other preferred features of a piston assembly adopting piston and connecting rod retention according to the invention include: wear-resistant ring carrier material (e.g. Ni-resist); reduced top-land height; integral coolant gallery; and ceramic fiber reinforcement. Generally, the piston assembly will be of aluminum alloy, with a steel connecting rod, although any suitable material combination may be used.

BRIEF DESCRIPTION OF THE DRAWINGS

Some particular embodiments of the invention will now be described, by way of example only, and with reference to the accompanying diagrammatic and schematic drawings, in which:

FIG. 3 shows an end view of a retaining ring of the assembly of FIGS. 1 and 2;

FIG. 4 shows a three-dimensional part cut-away, part-sectioned view of the spherical piston-connecting rod joint of FIGS. 1 through 3; and FIG. 5 depicts an alternative embodiment of a retaining ring.

DESCRIPTION OF THE PREFERRED EMBODIMENT(S)

The term "retention" is used herein to embrace any form of (inter)connection, (inter)coupling, entrainment, joining, or (mutual) restraint. Thus, for example, retention could inhibit elements, or joints and bearings therebetween, becoming wholly disconnected or uncoupled—and thus independently movable.

Harmony and continuity of movement is important in translating the motion mode of one element into that of another element connected thereto. Retention is a contributory factor to that end.

The terms "upper" and "lower" relate merely to relative dispositions of components, as shown in the diagrams. In a working engine (or pump), components may be arranged in any appropriate disposition or orientation, as indeed may an engine as a whole, subject to preserving lubrication (such as oil feed and oil pressure), coolant supply, fuel feed and "breathing" through intake and exhaust valving, ports and manifold ducting.

Moreover, the term "small-end" refers to the end of the connecting rod that is connected to the piston. Thus the small end need not necessarily be physically small, nor smaller than the so-called "big end" of the connecting rod. Similarly, the term "big end" merely identifies a connection to the crankshaft—again not necessarily relative or absolute size.

Figure 1:
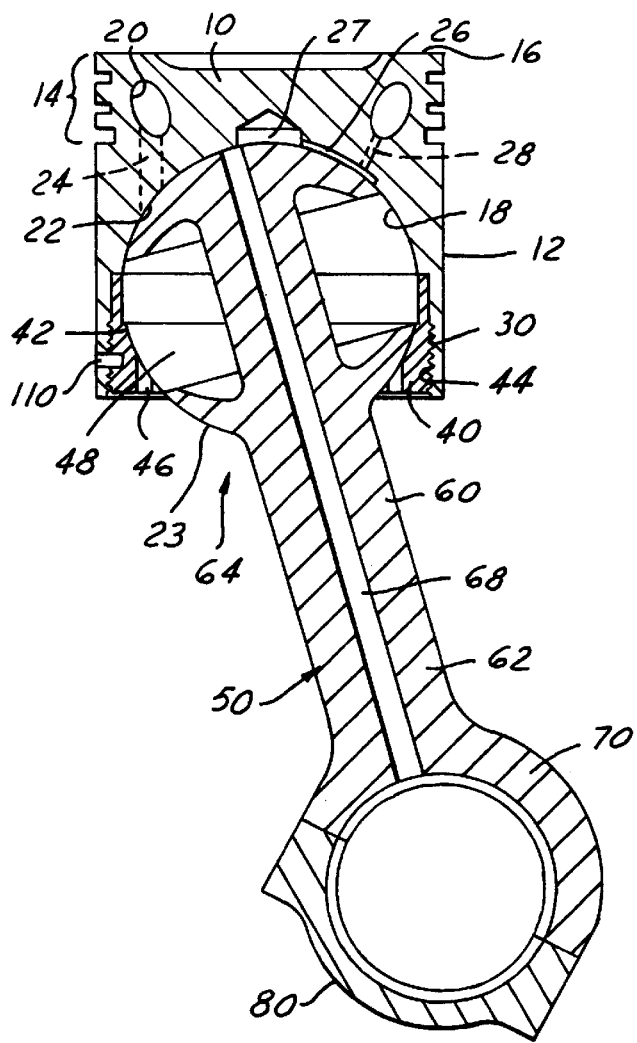
FIG. 1 illustrates a cross-sectional view through a spherically-jointed, piston and connecting rod assembly.

Referring to the drawings, a (spherically-jointed) piston and connecting rod assembly of FIG. 1 includes a piston 10 fitted with a connecting rod 50. The piston 10 has a hollow underside, bounded by a peripheral skirt 12, a ring belt 14, a crown 16, a coolant gallery 20, and threads 30 upon an internal peripheral wall of the skirt 12.

The connecting rod 50 has a "small end" 64 with spherical, or rather part-spherical, bearing surfaces 22, 23. The small end bearing surfaces 22, 23 are constrained between complementary opposed (part-) spherical bearing surfaces 18 and 42, respectively, on the hollow underside of the piston crown and upper inner rim of unitary annular retaining ring 40. The small end 64 is effectively retained in situ by the retaining ring 40. An outer threaded circumference 44 of the retaining ring 40 mates with complementary threads 30 on the internal circumference of the piston skirt 12.

The connecting rod 50 is in two parts, namely: an upper part 60 which includes the small end 64, a shank 62 and upper portion of a "big end" bearing housing 70, and a lower part with an end closure or retention bearing cap 80.

The (cylindrical) piston body is axial-symmetric—except for various ancillary internal (cast and/or drilled) passages, or oil-ways, for feeding and drainage of lubricating and coolant oil. The piston 10 depicted herein has an integrated cooling provision through an (optional) coolant gallery 20, located between the piston crown 16 and part-spherical bearing 18, with a supply and drainage path for oil. However, the piston retention feature of the present invention is broadly applicable to pistons without such a gallery.

Figure 2:
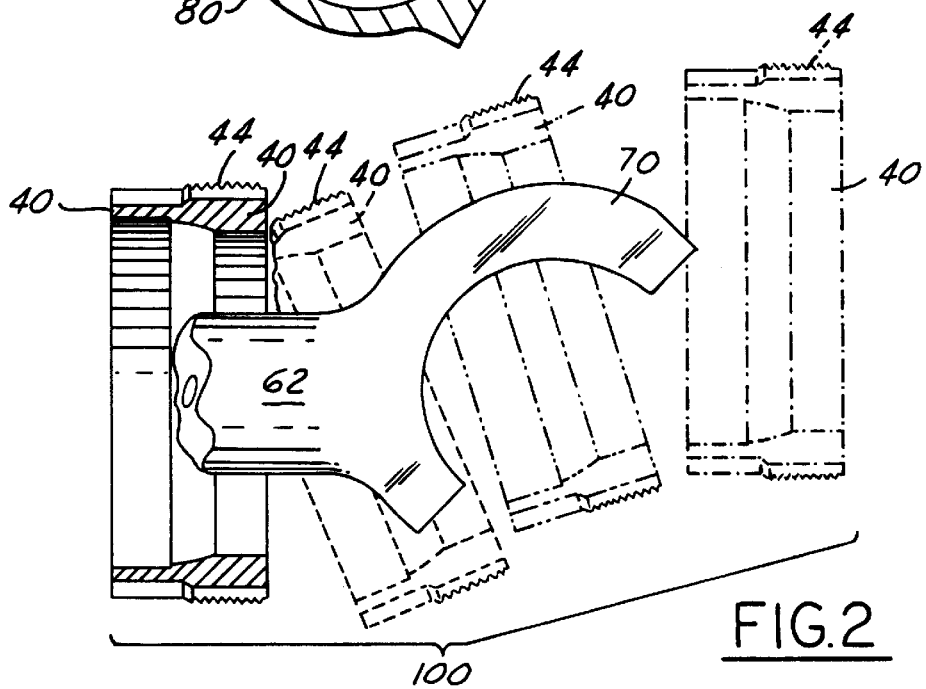
FIG. 2 depicts schematically part of an assembly sequence for fixing a retaining ring upon the connecting rod of the piston assembly of FIG. 1.

The piston retaining ring 40 is not axial-symmetric, as may be appreciated from the end view of FIG. 3. More specifically, an internal aperture 45 of the retaining ring 40 is profiled, with diametrical cut-outs or notches 45A and 45B to complement the connecting rod local (rectangular) cross-section (as shown in FIG. 4) which in turn varies somewhat along its length. This allows passage of the retaining ring 40 with some re-orientation relative to the connecting rod 50 to be mounted progressively over the connecting rod 50, in a particular way, or ways, such as depicted in FIG. 2 and indicated by the reference numeral 100.

The retaining ring 40 is secured in place in the piston body preferably by the threaded connection as indicated above. Alternatively, the ring 40 can be secured either primarily or secondarily by one or more fasteners 110, as shown in FIG. 1.

Other contours for the aperture 45, for example, with non-diametrical cut-outs, are possible in order to provide the necessary local increase in breadth. This in turn enables the retaining ring 40 to fit around (taken individually, in turn) the big end housing 70 and the lower part of the shank 62 of the connecting rod 50. The ring 40, with the connecting rod held captive thereto, can then be installed within the piston 10.

Although the retaining ring 40 as shown in FIGS. 1–4 is preferably a closed loop one-piece unitary device having a profiled opening or aperture thereon, it is also possible to utilize a retaining ring 40' as shown in FIG. 5 which has an open loop configuration with a slot 120 thereon. In this regard, preferably an open loop retaining ring, such as 40', has a sufficient body to cover over 300° in order to provide the requisite strength, durability and rigidity necessary for mating with the piston body and extended usage in an internal combustion engine.

When installing the ring 40, in order to gain purchase for rotation, use may be made of drain holes 46 as location points, in combination with a peg spanner (not shown). In this way the necessary tightening torque can be applied, upon engaging the mating threads 30, 44, thereby in turn fastening the ring 40 to the piston 10.

If (integrated) piston cooling is incorporated, oil passes from an engine oil pump (not shown) through passages or oil-ways in the crankshaft (not shown) via the big end housing 70, up a central passage 68 of the connecting rod 50, to a chamber 27 formed (centrally) in the underside of the piston crown 16. In one possible variation, transverse grooves 26 feed oil out to the passages 28 and also ensure ample lubrication of the spherical bearing surfaces 18, 22 between the underside of the piston 10 and the upper portion of the connecting rod 50 small end 64. Oil passes through the passages 28 into the coolant gallery 20 and is vigorously shaken up and down by the reciprocating motion of the piston 10. In this manner, the oil collects heat from the internal surfaces. Oil then passes down the drain holes 24 escaping past the (part) spherical small end 64 of the connecting rod 50 and into a ring gallery 48 formed around the connecting rod small end 64.

The ring gallery 48 helps lubricate the (part-) spherical bearing surfaces 23 and 42 between the lower portion of the small end 64 and the upper portion of the retaining ring 40. More heat is collected here as the oil is shaken up and down in this space before the oil escapes down the lower drain holes 46, formed in the piston retaining ring 40 and away into the crankcase. Some oil will also escape over the small end bearing surface 23, lubricating it as it does so.

Refinements in coolant gallery configuration and localized collection and distribution between connecting rod and piston are disclosed in the Applicants' co-pending UK patent applications Nos. 9909034.2 and 9909033.4, the disclosures of which are hereby incorporated herein by reference.

The sequence of installation and assembly shown in FIG. 2 shows how the connecting rod 50 can be passed through the piston retaining ring 40 and how its profiled aperture 45 is shaped to facilitate this with some relative orientation. For a robust engine, the big-end bearing must be of substantial diameter. A connecting rod big end split perpendicularly to its shank axis would not be able to pass through the piston retaining ring without the profiled aperture. Conversely, a big end bearing of a smaller connecting rod that was split perpendicularly to its shank axis and so which could pass through the retaining ring would not be sufficiently substantial or robust to survive the loads in a heavy duty engine.

Overall, a particular aspect of the invention thus provides a piston and connecting rod assembly in which a connecting rod small-end surface mates with a piston, the piston being retained upon the connecting rod by a discrete unitary retaining ring. More particularly, the piston retaining ring and connecting rod are configured to allow the piston retaining ring to pass over the connecting rod big end, up its shank and hence to trap and constrain the connecting rod small end between complementary (part-spherical or part-cylindrical) bearing surfaces formed respectively in the piston body and the retaining ring.

For operating conditions such as those encountered in two-stroke, compression-ignition (diesel) engines where working (combustion gas) loads are generally always compressive, that is such as to push the piston down onto the connecting rod, the features that retain the piston to the connecting rod do not need to be nearly as substantial as for, say, a four-stroke engine.

While the invention has been described in connection with one or more embodiments, it is to be understood that the specific mechanisms and techniques which have been described are merely illustrative of the principles of the invention. Numerous modifications may be made to the methods and apparatus described without departing from the spirit and scope of the invention as defined by the appended claims.

What is claimed is:

1. A piston assembly comprising a piston body, a connecting rod having a small end and a big end, and a unitary piston retaining ring, said retaining ring being installed within said piston body for retaining said connecting rod small end therein, said retaining ring being a closed one-piece ring and having a profiled opening with a pair of opposed notches in order to fit over said big end of said connecting rod during installation.

2. The piston assembly as recited in claim 1 incorporating a spherical bearing joint between said piston and said connecting rod small end, and a spherical bearing joint between said connecting rod small end and said retaining ring to allow piston rotation about its axis.

3. The piston assembly as recited in claim 1 wherein said retaining ring is secured to said piston body by a threaded interconnection between the piston body and the retaining ring.

4. The piston assembly as recited in claim 1 further comprising a fastener through both the retaining ring and the piston body for securing said retaining ring to said piston body.

5. The piston assembly as recited in claim 1 wherein said piston body is made from an aluminium alloy.

6. The piston assembly as recited in claim 1 wherein said piston is made at least partly of cast iron.

7. A reciprocating piston-in-cylinder device, whether configured as an internal combustion engine or pump, incorporating a piston assembly, as claimed in claim 1.

8. A reciprocating piston-in-cylinder device, incorporating a piston assembly as claimed in claim 1 and configured as a two-stroke, compression-ignition diesel engine.

9. A piston assembly comprising a piston body, a connecting rod having a small end and a big end, and a unitary piston retaining ring, said retaining ring being installed within said piston body for retaining said connecting rod small end therein, said retaining ring having a central opening, a slot therein to allow installation laterally over said connecting rod, and a notch opposite to said slot.

10. The piston assembly as recited in claim 9 incorporating a spherical bearing joint between said piston and said connecting rod small end, and a swivel bearing joint between said connecting rod small end and said retaining ring to allow piston rotation about its axis.

11. The piston assembly as recited in claim 9 wherein said retaining ring is secured to said piston body by a threaded interconnection between the piston body and the retaining ring.

12. The piston assembly as recited in claim 9 further comprising a fastener through both the retaining ring and the piston body for securing said retaining ring to said piston body.

13. The piston body as recited in claim 9 wherein said piston body is made from an aluminum alloy.

14. The piston assembly as recited in claim 9 wherein said piston is made at least partly of cast iron.

\* \* \* \* \*